United States Patent
Liu

(10) Patent No.: US 11,304,067 B2
(45) Date of Patent: Apr. 12, 2022

(54) METHODS AND DEVICES FOR REPORTING AND DETERMINING OPTIMAL BEAM, USER EQUIPMENT, AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 17 days.

(21) Appl. No.: 16/622,893

(22) PCT Filed: Aug. 30, 2017

(86) PCT No.: PCT/CN2017/099563
§ 371 (c)(1),
(2) Date: Dec. 13, 2019

(87) PCT Pub. No.: WO2019/041151
PCT Pub. Date: Mar. 7, 2019

(65) Prior Publication Data
US 2020/0213868 A1    Jul. 2, 2020

(51) Int. Cl.
*H04W 24/10*    (2009.01)
*H04W 16/28*    (2009.01)
(Continued)

(52) U.S. Cl.
CPC .......... *H04W 16/28* (2013.01); *H04W 24/10* (2013.01); *H04W 68/005* (2013.01); *H04W 72/046* (2013.01)

(58) Field of Classification Search
CPC ... H04W 16/28; H04W 24/10; H04W 68/005; H04W 72/046; H04W 74/004;
(Continued)

(56) References Cited

U.S. PATENT DOCUMENTS

2009/0168722 A1   7/2009  Saifullah
2013/0121185 A1   5/2013  Li et al.
(Continued)

FOREIGN PATENT DOCUMENTS

CN    101137185 A    3/2008
CN    104969588 A    10/2015
(Continued)

OTHER PUBLICATIONS

International Search Report in the international application No. PCT/CN2017/099563, dated May 2, 2018.
(Continued)

*Primary Examiner* — Chuong A Ngo
(74) *Attorney, Agent, or Firm* — Syncoda LLC; Feng Ma

(57) ABSTRACT

A method for reporting an optimal beam includes: a MSG3 is sent to a base station on a measured optimal beam; and a MSG4 returned by the base station is waited to be received on both the optimal beam and an initial beam originally configured to send the MSG3. As the MSG3 is sent to the base station on a measured optimal beam, the optimal beam can be reported implicitly in the random-access process; and as no bit for representing beam information needs to be additionally defined, resources can be saved.

10 Claims, 13 Drawing Sheets

(51) Int. Cl.
*H04W 68/00* (2009.01)
*H04W 72/04* (2009.01)

(58) Field of Classification Search
CPC . H04W 72/085; H04W 92/10; H04W 74/006; H04W 74/0866; H04B 7/0695; H04B 7/088; H04B 7/0421
See application file for complete search history.

(56) References Cited

U.S. PATENT DOCUMENTS

| | | | |
|---|---|---|---|
| 2015/0382171 A1 | 12/2015 | Roy et al. | |
| 2017/0223744 A1* | 8/2017 | Qian | H04W 16/28 |
| 2018/0035460 A1 | 2/2018 | Yi et al. | |

FOREIGN PATENT DOCUMENTS

| | | |
|---|---|---|
| CN | 106255037 A | 12/2016 |
| CN | 106961713 A | 7/2017 |

OTHER PUBLICATIONS

English translation of the Written Opinion of the International Search Authority in the international application No. PCT/CN2017/099563, dated May 2, 2018.

3rd Generation Partnership Project; Technical Specification Group Radio Access Network; Study on New Radio (NR) to support Non Terrestrial Networks (Release 15) 3GPP TR 38.811V0.1.0 (Jun. 2017).

Samsung:"Random Access Procedure in NR", 3GPP Draft; R2-167568 Random Access Procedure in NR, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016 Nov. 13, 2016 (Nov. 13, 2016), XP051177436, Retrieved from the Internet: URL:http://www.3gpp.org/ftp/Meetings_3GPP_SYNC/RAN2/Docs/ [retrieved on Nov. 13, 2016] *p. 5; figure 7*.

Supplementary European Search Report in the European application No. 17923292.1, dated May 8, 2020.

* cited by examiner

METHODS AND DEVICES FOR REPORTING AND DETERMINING OPTIMAL BEAM, USER EQUIPMENT, AND BASE STATION

CROSS-REFERENCE TO RELATED APPLICATION

This application is a national phase application of PCT/CN2017/099563 filed on Aug. 30, 2017, the disclosure of which is hereby incorporated by reference in its entirety.

TECHNICAL FIELD

The present disclosure generally relates to the technical field of communications, and more particularly to, methods and devices for reporting and determining an optimal beam, User Equipment (UE), a base station and a computer-readable storage medium.

BACKGROUND

Along with rapid development of wireless communication technologies, 5th Generation (5G) systems have emerged. A 5G system will be applied to high bands, i.e., bands above 6 GHz. In a high band, conventional omnidirectional transmission is not applied anymore due to a poor propagation characteristic of a radio wave, and beam scanning and beam management need to be introduced for communication.

A Synchronous Signal Block (SSB), as a basis for downlink beam measurement in an initial access process, includes a beam Identifier (ID), and thus UE may report a beam according to the ID.

A process that UE performs information interaction with a network for the first time is a random-access process. A first message (MSG1) in the random-access process is a preamble, which cannot support a function of reporting an optimal beam, so that a first piece of uplink information capable of reporting an optimal beam is a third message (MSG3). That is, the UE reports an ID of an optimal beam, and the beam may be a beam corresponding to the MSG1 or a second message (MSG2) or may be another beam.

UE is in movement and the UE may be between two beams, thus, it cannot be surely determined which one of the two beams is measured during downlink synchronization. Therefore, the optimal beam may change. In a case that the UE reports the optimal beam in the random-access process, beam adjustment, particularly signaling and uplink/downlink data transmission after the random access, of a base station can be facilitated.

In a related art, an optimal beam measured previously is directly reported through MSG3. However, in this manner, 6 bits (corresponding to at most 64 beams) are required to be additionally defined, and radio resources are wasted accordingly.

SUMMARY

In view of this, the present disclosure provides methods and devices for reporting and determining an optimal beam, UE, a base station and a computer-readable storage medium, which enable an optimal beam to be reported using saved resources in a random-access process.

According to a first aspect of embodiments of the present disclosure, a method for reporting an optimal beam is provided, which may be applied to UE and include that:

a third message (MSG3) is sent to a base station on an optimal beam measured; and a fourth message (MSG4) returned by the base station is waited to be received on both the optimal beam and an initial beam originally configured to send the MSG3.

In an embodiment, after the operation that the MSG4 returned by the base station is waited to be received on both the optimal beam and the initial beam originally configured to send the MSG3, the method may further include that:

in a case that the MSG4 is received on the optimal beam, signaling or data is transmitted on the optimal beam; and in a case that the MSG4 is received on the initial beam, an optimal beam measurement request sent by the base station is received, and an optimal beam measurement report is sent to the base station based on the optimal beam measurement request to enable the base station to return an ID of an adjusted optimal beam based on the optimal beam measurement report.

In an embodiment, the method may further include that:

after the optimal beam measurement report is sent to the base station, in a case that the UE is kept in a connected state, signaling or data sent by the base station on the adjusted optimal beam is received.

According to a second aspect of the embodiments of the present disclosure, a method for determining an optimal beam is provided, which may be applied to a base station and include that:

a third message (MSG3) sent by UE on an optimal beam is received; and a fourth message (MSG4) is returned to the UE on the optimal beam, or a fourth message (MSG4) is returned to the UE on an initial beam originally configured to send the MSG3.

In an embodiment, the method may further include that:

after the MSG4 is returned to the UE on the initial beam originally configured to send the MSG3, an optimal beam measurement request is sent to the UE;

an optimal beam measurement report sent by the UE based on the optimal beam measurement request is received; and beam adjustment is performed according to an optimal beam ID contained in the optimal beam measurement report, and an ID of an adjusted optimal beam is sent to the UE.

In an embodiment, the method may further include that:

after the ID of the adjusted optimal beam is sent to the UE, signaling or data is transmitted on the adjusted optimal beam.

In an embodiment, the method may further include that:

after the MSG4 is returned to the UE on the optimal beam, signaling or data is transmitted on the optimal beam.

According to a third aspect of the embodiments of the present disclosure, a device for reporting an optimal beam is provided, which may be applied to UE and include:

a sending module, configured to send a third message (MSG3) on an optimal beam measured to a base station; and a reception waiting module, configured to, after the sending module sends the MSG3 to the base station on the optimal beam, wait, on both the optimal beam and an initial beam originally configured to send the MSG3, to receive a fourth message (MSG4) returned by the base station.

In an embodiment, the device may further include:

a transmission determination module, configured to, after the reception waiting module waits, on both the optimal beam and the initial beam originally configured to send the MSG3, to receive the MSG4 returned by the base station, in a case that the MSG4 is received on the optimal beam, transmit signaling or data on the optimal beam; and a transceiving determination module, configured to, after the reception waiting module waits, on both the optimal beam and the initial beam originally configured to send the MSG3, to receive the MSG4 returned by the base station, in a case that the MSG4 is received on the initial beam, receive an optimal beam measurement request sent by the base station and send an optimal beam measurement report to the base station based on the optimal beam measurement request to enable the base station to return an ID of an adjusted optimal beam based on the optimal beam measurement report.

In an embodiment, the device may further include:

a receiving module, configured to, after the transceiving determination module sends the optimal beam measurement report to the base station, in a case that the UE is kept in a connected state, receive signaling or data sent by the base station on the adjusted optimal beam.

According to a fourth aspect of the embodiments of the present disclosure, A device for determining an optimal beam is provided, which may be applied to a base station and include:

a receiving module, configured to receive a third message (MSG3) sent by UE on an optimal beam; and a returning module, configured to, after the receiving module receives the MSG3, return a fourth message (MSG4) to the UE on the optimal beam or return a fourth message (MSG4) to the UE on an initial beam originally configured to send the MSG3.

In an embodiment, the device may further include:

a request sending module, configured to, after the returning module returns the MSG4 to the UE on the initial beam originally configured to send the MSG3, send an optimal beam measurement request to the UE;

a report receiving module, configured to receive an optimal beam measurement report sent by the UE based on the optimal beam measurement request sent by the request sending module; and an adjusting and sending module, configured to perform beam adjustment according to an optimal beam ID contained in the optimal beam measurement report received by the report receiving module and send an ID of an adjusted optimal beam to the UE.

In an embodiment, the device may further include:

a first transmission module, configured to, after the adjusting and sending module sends the ID of the adjusted optimal beam to the UE, transmit signaling or data on the adjusted optimal beam.

In an embodiment, the device may further include:

a second transmission module, configured to, after the returning module returns the MSG4 to the UE on the optimal beam, transmit signaling or the data on the optimal beam.

According to a fifth aspect of the embodiments of the present disclosure, UE is provided, which may include:

a processor; and a memory configured to store instructions executable for the processor, wherein the processor may be configured to:

send a third message (MSG3) on an optimal beam measured to a base station; and wait, on both the optimal beam and an initial beam originally configured to send the MSG3, to receive a fourth message (MSG4) returned by the base station.

According to a sixth aspect of the embodiments of the present disclosure, a base station is provided, which may include:

a processor; and a memory configured to store instructions executable for the processor, wherein the processor may be configured to:

receive a third message (MSG3) sent by UE on an optimal beam; and return a fourth message (MSG4) to the UE on the optimal beam or return a fourth message (MSG4) to the UE on an initial beam originally configured to send the MSG3.

According to a seventh aspect of the embodiments of the present disclosure, a computer-readable storage medium is provided, which has a computer program stored thereon that, when executed by a processor, enables to implement the steps of the method for reporting an optimal beam of claim 1.

According to an eighth aspect of the embodiments of the present disclosure, a computer-readable storage medium is provided, which has a computer program stored thereon that, when executed by a processor, enables to implement the steps of the method for determining an optimal beam of claim 4.

The technical solutions provided in the embodiments of the present disclosure may have the following beneficial effects.

MSG3 may be sent to a base station on a measured optimal beam, so that the measured optimal beam can be reported implicitly in a random-access process, without additionally defining any bit for representing beam information, thereby saving resources.

The MSG3 sent by the UE on the optimal beam may be received, and then the base station may learn about the optimal beam measured by the UE. No bit for representing beam information needs to be additionally defined in an implementation process, so that resources can be saved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
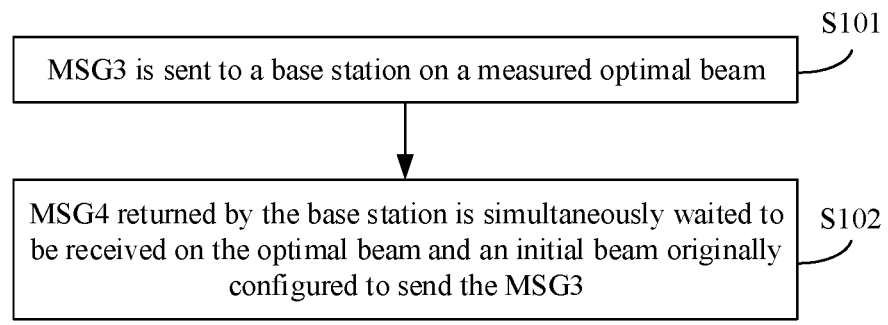
FIG. 1 is a flowchart illustrating a method for reporting an optimal beam according to an exemplary embodiment of the present disclosure.

FIG. 1 is a flowchart illustrating a method for reporting an optimal beam according to an exemplary embodiment of the present disclosure. The embodiment is described from a UE side. As shown in FIG. 1, the method for reporting an optimal beam includes the following steps.

In step S101, MSG3 is sent to a base station on a measured optimal beam.

UE may send the MSG3 to the base station on the optimal beam measured previously in a random-access process, and the base station may select to change the beam to return a fourth message (MSG4) or may select to return the MSG4 without changing the beam.

In step S102, MSG4 returned by the base station is waited to be received on both the optimal beam and an initial beam originally configured to send the MSG3.

Since the UE does not know whether the base station changes the beam to return the MSG4 or not, the UE may wait simultaneously, on both the optimal beam and the initial beam originally configured to send the MSG3, to receive the MSG4 returned by the base station.

According to the embodiment, the MSG3 may be sent to the base station on the measured optimal beam, so that the optimal beam can be reported implicitly in the random-access process. No bit for representing beam information needs to be additionally defined, so that resources can be saved.

Figure 2:
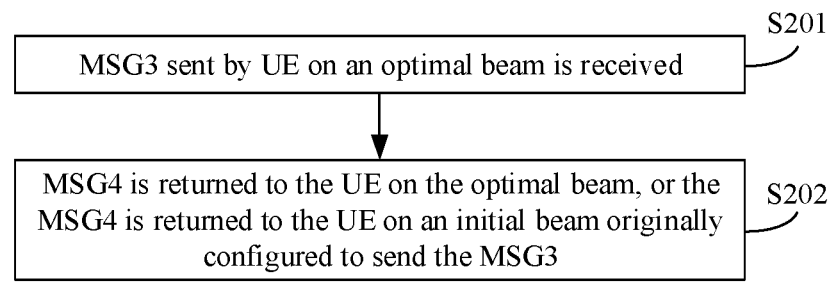
FIG. 2 is a flowchart illustrating a method for determining an optimal beam according to an exemplary embodiment of the present disclosure.

FIG. 2 is a flowchart illustrating a method for determining an optimal beam according to an exemplary embodiment of the present disclosure. The embodiment is described from a base station side. As shown in FIG. 2, the method for determining an optimal beam includes the following steps.

In step S201, MSG3 sent by UE on an optimal beam is received.

For saving resources, the UE may directly send the MSG3 on the optimal beam measured previously.

In step S202, MSG4 is returned to the UE on the optimal beam, or the MSG4 is returned to the UE on an initial beam originally configured to send the MSG3.

A base station, after receiving the MSG3 sent by the UE on the optimal beam, may return the MSG4 to the UE on the optimal beam or may return the MSG4 to the UE on the initial beam originally configured to send the MSG3.

In a case that the base station returns the MSG4 to the UE on the optimal beam, it is indicated that the base station has performed beam adjustment based on the optimal beam reported by the UE. In a case that the base station returns the MSG4 to the UE on the initial beam originally configured to send the MSG3, it is indicated that the base station does not perform beam adjustment based on the optimal beam reported by the UE.

According to the embodiment, the MSG3 sent by the UE on the optimal beam is received, and then the base station may learn about the optimal beam measured by the UE. No bit for representing beam information is needed to be additionally defined in an implementation process, so that resources can be saved.

Figure 3:
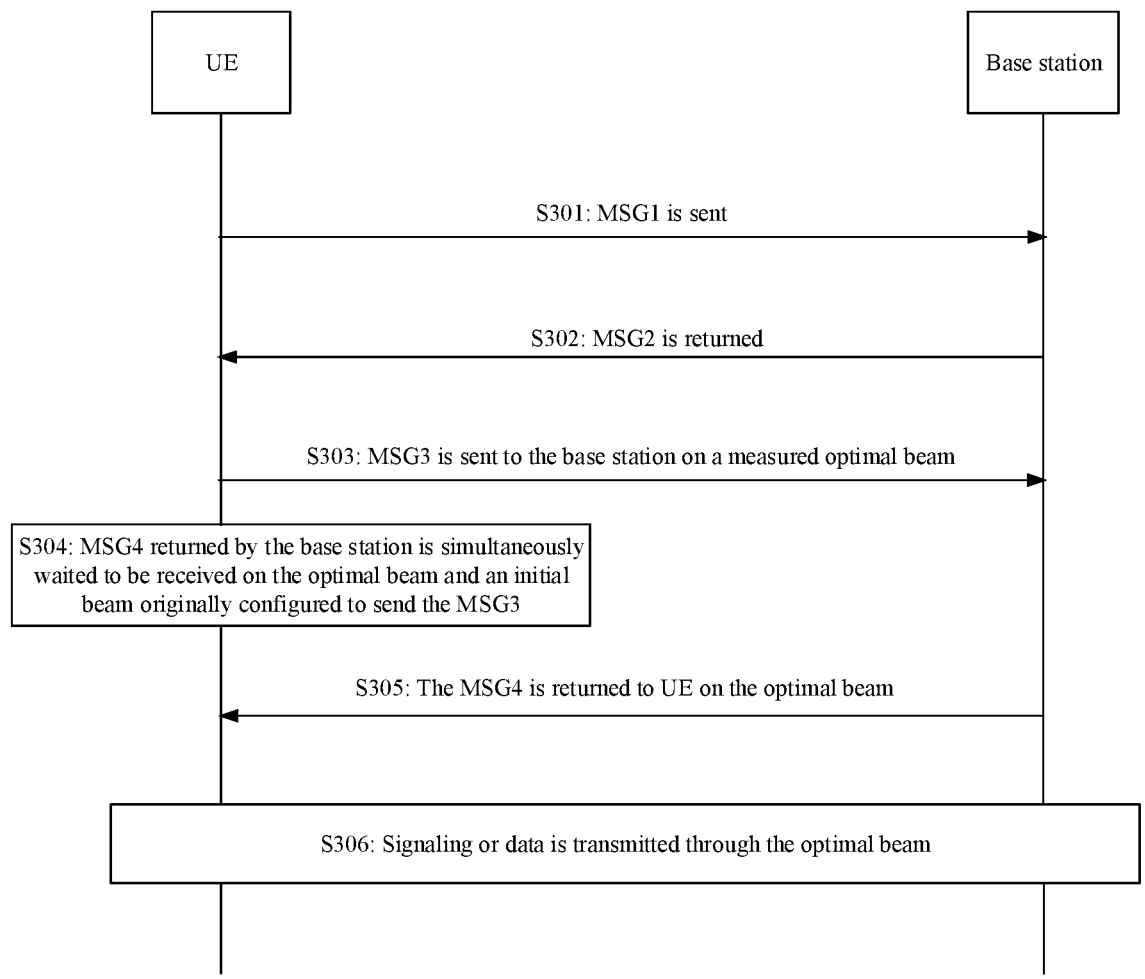
FIG. 3 is a signaling flowchart illustrating a method for reporting an optimal beam according to an exemplary embodiment of the present disclosure.

FIG. 3 is a signaling flowchart illustrating a method for reporting an optimal beam according to an exemplary embodiment of the present disclosure. The embodiment is described from the angle of interaction between a base station and UE. As shown in FIG. 3, the method for reporting an optimal beam includes the following steps.

In step S301, the UE sends MSG1 to the base station.

In step S302, the base station returns MSG2 to the UE.

In step S303, the UE sends MSG3 to the base station on a measured optimal beam.

In step S304, the UE waits, on both the optimal beam and an initial beam originally configured to send the MSG3, to receive MSG4 returned by the base station.

In step S305, the base station returns the MSG4 to the UE on the optimal beam.

In step S306, signaling or data is transmitted between the UE and the base station through the optimal beam.

In the embodiment, in a case that the UE receives the MSG4 returned by the base station on the optimal beam, it is indicated that the base station has performed beam adjustment based on the optimal beam reported by the UE. Then, in a case that the UE is kept in a connected state, the signaling or the data may be transmitted between the UE and the base station through the optimal beam.

The operation that the signaling or the data is transmitted between the UE and the base station through the optimal beam may include that the UE sends the signaling or the data to the base station through the optimal beam, and may also include that the UE receives the signaling or data sent by the base station through the optimal beam. That is, two-way transmission can be performed between the UE and the base station.

According to the embodiment, through the interaction between the UE and the base station, the UE may implicitly report the optimal beam in a random access process, and then the base station may receive the reported optimal beam and adjust the beam accordingly, thereby implementing signaling or data transmission through the optimal beam to improve the transmission efficiency.

Figure 4:
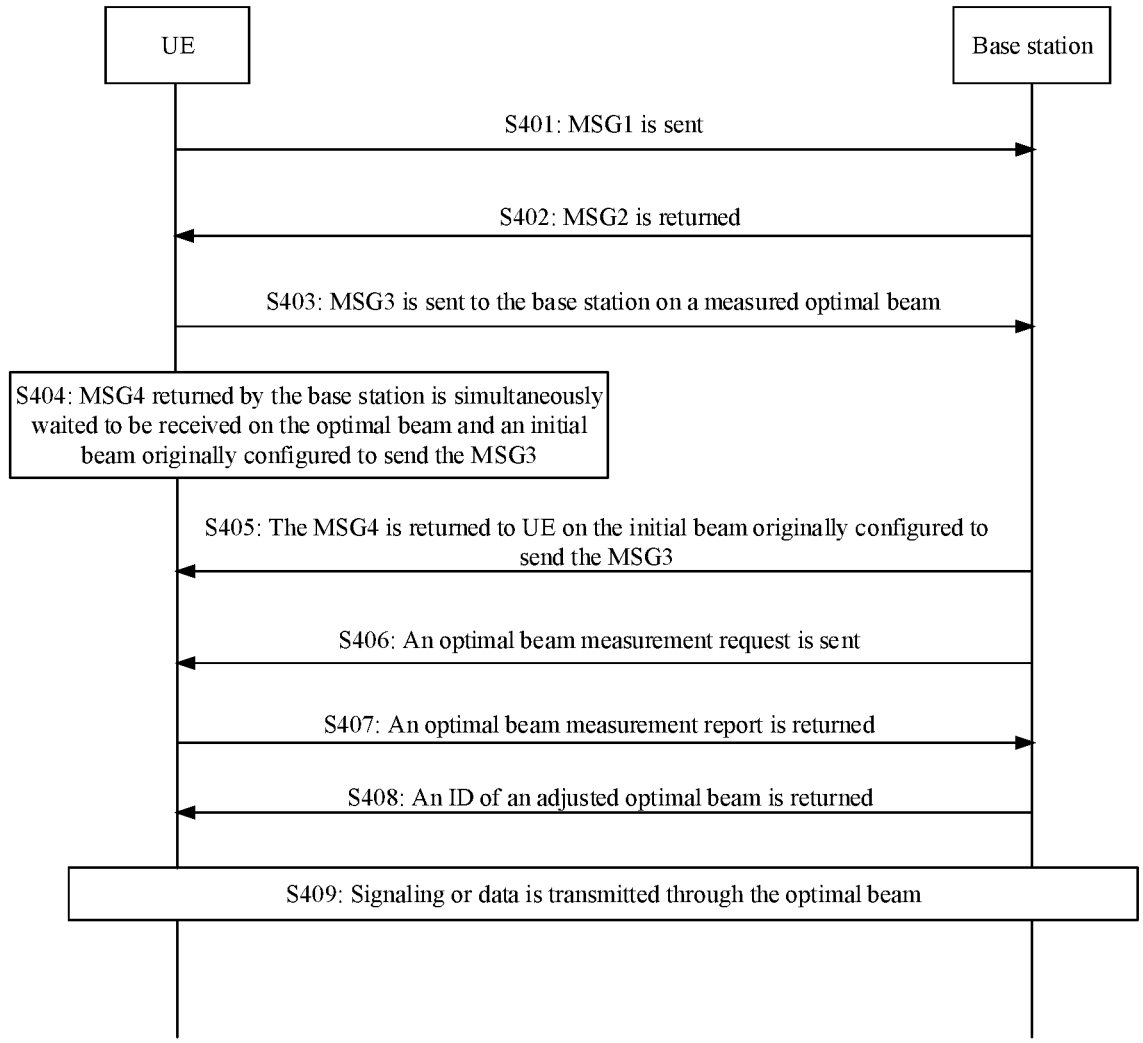
FIG. 4 is a signaling flowchart illustrating another method for reporting an optimal beam according to an exemplary embodiment of the present disclosure.

FIG. 4 is a signaling flowchart illustrating a method for reporting an optimal beam according to an exemplary embodiment of the present disclosure. The embodiment is described from the angle of interaction between a base station and UE. As shown in FIG. 4, the method for reporting an optimal beam includes the following steps.

In step S401, the UE sends MSG1 to the base station.

In step S402, the base station returns MSG2 to the UE.

In step S403, the UE sends MSG3 to the base station on a measured optimal beam.

In step S404, the UE waits to receive MSG4 returned by the base station on both the optimal beam and an initial beam originally configured to send the MSG3.

In step S405, the base station returns the MSG4 to the UE on the initial beam originally configured to send the MSG3.

In step S406, the base station sends an optimal beam measurement request to the UE.

In step S407, the UE returns an optimal beam measurement report to the base station according to the received optimal beam measurement request.

In step S408, the base station performs beam adjustment according to an optimal beam ID contained in the optimal beam measurement report and sends an ID of an adjusted optimal beam to the UE.

The optimal beam reported by the UE in a random access process may be not so accurate, therefore, after random access is completed, the optimal beam measurement request sent by the base station may be received and the optimal beam measurement report may be returned to the base station according to the optimal beam measurement request to enable the base station to perform beam adjustment according to the optimal beam ID contained in the optimal beam measurement report to obtain an accurate optimal beam.

In step S409, signaling or data is transmitted between the UE and the base station through the optimal beam.

The operation that the signaling or the data is transmitted between the UE and the base station through the optimal beam may include that the UE sends the signaling or the data to the base station through the optimal beam, and may also include that the UE receives the signaling or data from the base station through the optimal beam. That is, two-way transmission may be performed between the UE and the base station.

According to the embodiment, through the interaction between the UE and the base station, the base station, after the UE completes random access, may receive the optimal beam measurement report and perform beam adjustment according to the optimal beam ID contained in the optimal beam measurement report to obtain the accurate optimal beam and further implement signaling or data transmission through the optimal beam to improve the transmission efficiency.

Figure 5:
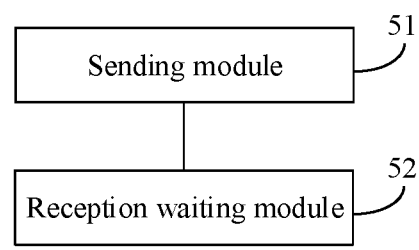
FIG. 5 is a block diagram of a device for reporting an optimal beam according to an exemplary embodiment.

FIG. 5 is a block diagram of a device for reporting an optimal beam according to an exemplary embodiment. The device may be in UE. As shown in FIG. 5, the device for reporting an optimal beam includes a sending module 51 and a reception waiting module 52.

The sending module 51 is configured to send a third message (MSG3) on an optimal beam measured to a base station.

The UE may send the MSG3 to the base station on the optimal beam measured previously in a random-access process, and the base station may select to change the beam to return a fourth message (MSG4) or may also select to return the MSG4 without changing the beam.

The reception waiting module 52 is configured to, after the sending module 51 sends the third message (MSG3) to the base station on the optimal beam measured, wait, on both the optimal beam and an initial beam originally configured to send the MSG3, to receive a fourth message (MSG4) returned by the base station.

Since the UE does not know whether the base station changes the beam to return the MSG4 or not, the UE may wait, on both the optimal beam and the initial beam originally configured to send the MSG3, to receive the MSG4 returned by the base station.

According to the embodiment, the MSG3 may be sent to the base station on the measured optimal beam, so that the optimal beam can be reported implicitly in the random-access process. No bit for representing beam information needs to be additionally defined, so that resources can be saved.

Figure 6:
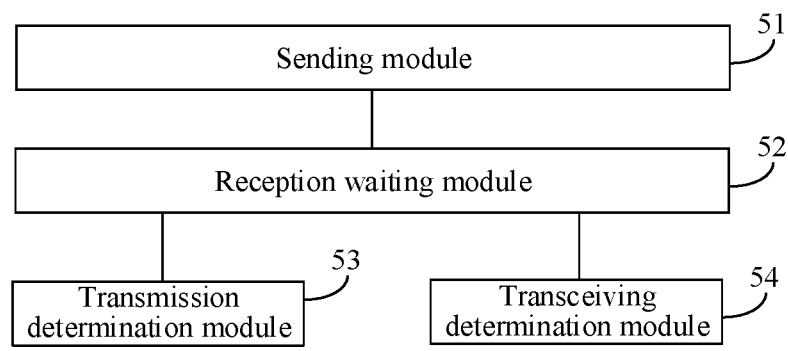
FIG. 6 is a block diagram of another device for reporting an optimal beam according to an exemplary embodiment.

FIG. 6 is a block diagram of another device for reporting an optimal beam according to an exemplary embodiment. As shown in FIG. 6, based on the embodiment shown in FIG. 5, the device may further include a transmission determination module 53 and a transceiving determination module 54.

The transmission determination module 53 is configured to, after the reception waiting module 52 waits, on both the optimal beam and the initial beam originally configured to send the MSG3, to receive the fourth message (MSG4) returned by the base station, in a case that the MSG4 is received on the optimal beam, transmit signaling or data on the optimal beam.

The transceiving determination module 54 is configured to, after the reception waiting module 52 waits, on both the optimal beam and the initial beam originally configured to send the MSG3, to receive the fourth message (MSG4) returned by the base station, in a case that the MSG4 is received on the initial beam, receive an optimal beam measurement request from the base station and send an optimal beam measurement report to the base station based on the optimal beam measurement request to enable the base station to return an ID of an adjusted optimal beam based on the optimal beam measurement report.

The optimal beam reported by the UE in a random access process may be not so accurate, therefore, after random access is completed, the optimal beam measurement request sent by the base station may be received and the optimal beam measurement report may be returned to the base station according to the optimal beam measurement request to enable the base station to perform beam adjustment according to the optimal beam ID contained in the optimal beam measurement report to obtain an accurate optimal beam.

According to the embodiment, in a case that the MSG4 is received on the optimal beam, it can be confirmed that the base station has performed beam adjustment based on the optimal beam reported by the UE, and the signaling or the data may be transmitted on the optimal beam; and in a case that the MSG4 is received on the initial beam, it can be confirmed that the base station does not perform beam adjustment based on the optimal beam reported by the UE, then the optimal beam measurement request sent by the base station may be received and the optimal beam measurement report may be sent to the base station according to the optimal beam measurement request to enable the base station to return an ID of an adjusted optimal beam according to the optimal beam measurement report to obtain a more accurate optimal beam.

Figure 7:
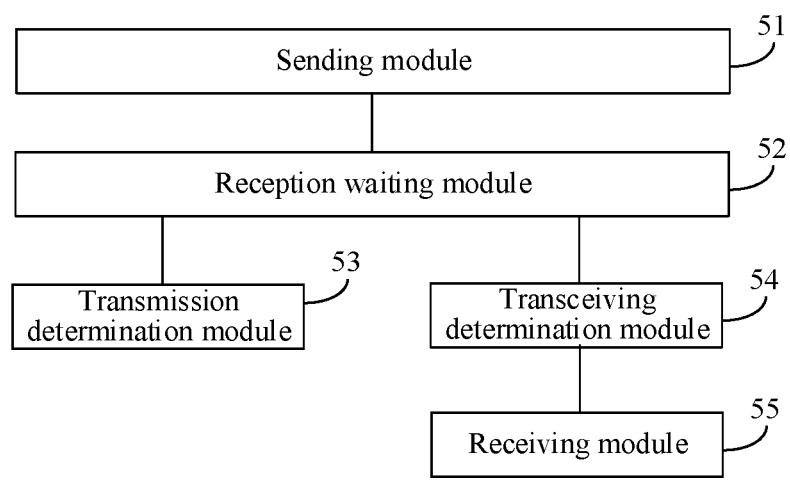
FIG. 7 is a block diagram of another device for reporting an optimal beam according to an exemplary embodiment.

FIG. 7 is a block diagram of another device for reporting an optimal beam according to an exemplary embodiment. As shown in FIG. 7, based on the embodiment shown in FIG. 6, the device may further include a receiving module 55.

The receiving module 55 is configured to, after the transceiving determination module 54 sends the optimal beam measurement report to the base station, in a case that the UE is kept in a connected state, receive the signaling or data sent by the base station on the adjusted optimal beam.

According to the embodiment, when the UE is kept in the connected state, the signaling or data sent by the base station on the adjusted optimal beam may be received; and since the adjusted optimal beam is more accurate, receiving the signaling or data sent by the base station on the adjusted optimal beam may achieve higher transmission efficiency.

Figure 8:
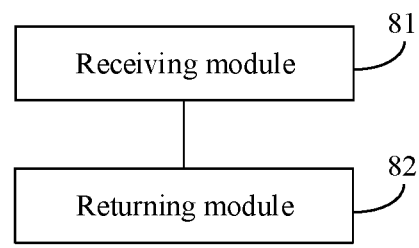
FIG. 8 is a block diagram of a device for determining an optimal beam according to an exemplary embodiment.

FIG. 8 is a block diagram of A device for determining an optimal beam according to an exemplary embodiment. The device may be in a base station. As shown in FIG. 8, the device for determining an optimal beam includes a receiving module 81 and a returning module 82.

The receiving module 81 is configured to receive a third message (MSG3) sent by UE on an optimal beam.

For saving resources, the UE may directly send the MSG3 on the optimal beam measured previously.

The returning module 82 is configured to, after the receiving module 81 receives the MSG3, return a fourth message (MSG4) to the UE on the optimal beam or return a fourth message (MSG4) to the UE on an initial beam originally configured to send the MSG3.

The base station, after receiving the MSG3 sent by the UE on the optimal beam, may return the MSG4 to the UE on the optimal beam or may return the MSG4 to the UE on the initial beam originally configured to send the MSG3.

In a case that the base station returns the MSG4 to the UE on the optimal beam, it can be indicated that the base station has performed beam adjustment based on the optimal beam reported by the UE. In a case that the base station returns the MSG4 to the UE on the initial beam originally configured to send the MSG3, it can be indicated that the base station does not perform beam adjustment based on the optimal beam reported by the UE.

According to the embodiment, the MSG3 sent by the UE on the optimal beam is received, and then the base station may learn about the optimal beam measured by the UE. No bit for representing the beam information needs to be additionally defined in an implementation process, so that resources can be saved.

Figure 9:
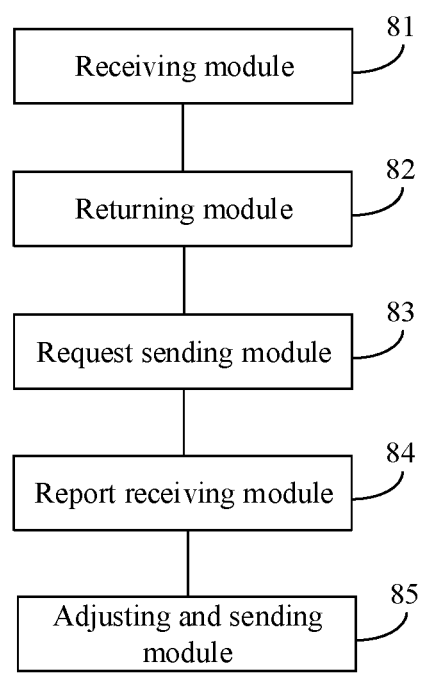
FIG. 9 is a block diagram of another device for determining an optimal beam according to an exemplary embodiment.

FIG. 9 is a block diagram of another device for determining an optimal beam according to an exemplary embodiment. As shown in FIG. 9, based on the embodiment shown in FIG. 8, the device may further include a request sending module 83, a report receiving module 84 and an adjusting and sending module 85.

The request sending module 83 is configured to, after the returning module 82 returns the fourth message (MSG4) to the UE on the initial beam originally configured to send the MSG3, send an optimal beam measurement request to the UE.

The report receiving module 84 is configured to receive an optimal beam measurement report sent by the UE according to the optimal beam measurement request sent by the request sending module 83.

The adjusting and sending module 85 is configured to perform beam adjustment according to an optimal beam ID contained in the optimal beam measurement report received by the report receiving module 84 and send an ID of an adjusted optimal beam to the UE.

The optimal beam reported by the UE in a random access process may be not so accurate, therefore, after random access is completed, the optimal beam measurement request sent by the base station may be received and the optimal beam measurement report may be returned to the base station according to the optimal beam measurement request to enable the base station to perform beam adjustment based on an optimal beam ID contained in the optimal beam measurement report to obtain an accurate optimal beam.

According to the embodiment, after the fourth message (MSG4) is returned to the UE on the initial beam originally configured to send the MSG3, the optimal beam measurement request may be sent to the UE, the optimal beam measurement report sent by the UE according to the optimal beam measurement request sent by the request sending module may be received, then beam adjustment may be performed based on an optimal beam ID contained in the optimal beam measurement report received by the report receiving module, and an ID of an adjusted optimal beam may be sent to the UE to obtain a more accurate optimal beam.

Figure 10:
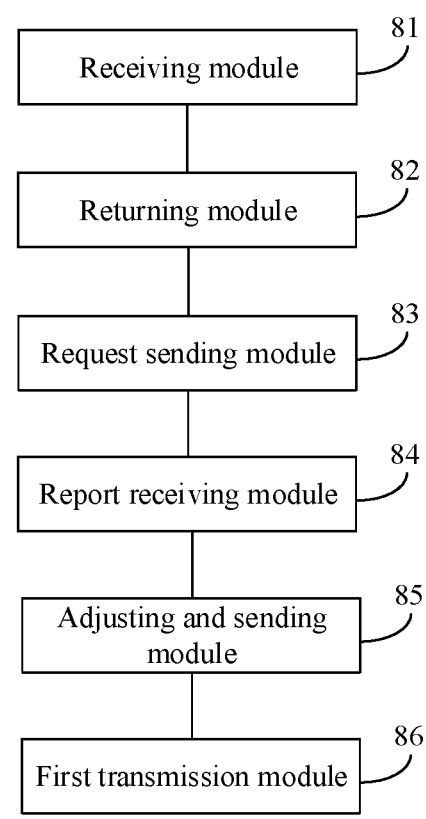
FIG. 10 is a block diagram of another device for determining an optimal beam according to an exemplary embodiment.

FIG. 10 is a block diagram of another device for determining an optimal beam according to an exemplary embodiment. As shown in FIG. 10, based on the embodiment shown in FIG. 9, the device may further include a first transmission module 86.

The first transmission module 86 is configured to, after the adjusting and sending module 85 sends the ID of the adjusted optimal beam to the UE, transmit signaling or data on the adjusted optimal beam.

According to the embodiment, the adjusted optimal beam is more accurate, so that transmitting the signaling or the data on the adjusted optimal beam can achieve higher transmission efficiency.

Figure 11:
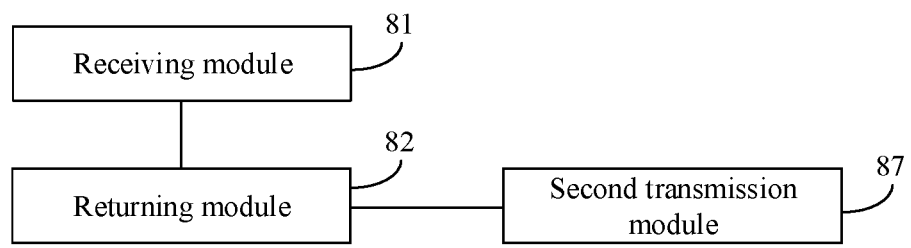
FIG. 11 is a block diagram of another device for determining an optimal beam according to an exemplary embodiment.

FIG. 11 is a block diagram of another device for determining an optimal beam according to an exemplary embodiment. As shown in FIG. 11, based on the embodiment shown in FIG. 8, the device may further include a second transmission module 87.

The second transmission module 87 is configured to, after the returning module 82 returns the MSG4 to the UE on the optimal beam, transmit the signaling or the data on the optimal beam.

According to the embodiment, transmitting the signaling or the data on the optimal beam can achieve higher transmission efficiency.

Figure 12:
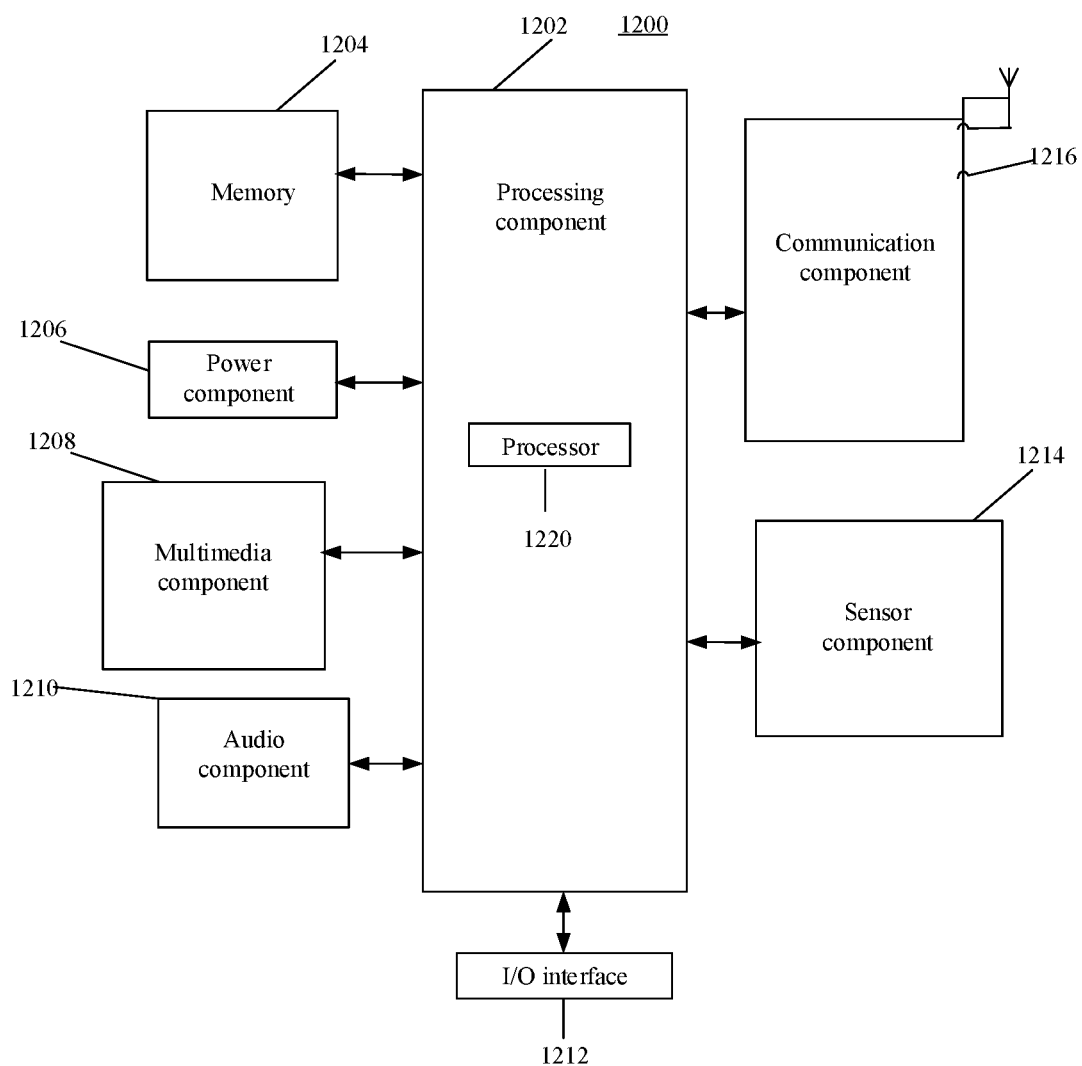
FIG. 12 is a block diagram applied to a device for reporting an optimal beam according to an exemplary embodiment.

FIG. 12 is a block diagram applied to a device for reporting an optimal beam according to an exemplary embodiment. For example, the device 1200 may be UE such as a mobile phone, a computer, a digital broadcast terminal, a messaging device, a gaming console, a tablet, a medical device, fitness equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 is typically configured to control overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 is configured to provide power for various components of the device 1200. The power component 1206 may include a power management system, one or more power supplies, and other components associated with generation, management and distribution of power for the device 1200.

The multimedia component 1208 may include a screen for providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 is configured to provide an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 may include one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, one processor in the processing component 1202 may be configured to:

send a third message (MSG3) on an optimal beam measured to a base station; and wait, on both the optimal beam and an initial beam originally configured to send the MSG3, to receive a fourth message (MSG4) returned by the base station.

In an exemplary embodiment, there is also provided a non-transitory computer-readable storage medium including instructions, such as the memory 1204 including instructions, and the instruction may be executed by the processor 1220 of the device 1200 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Figure 13:
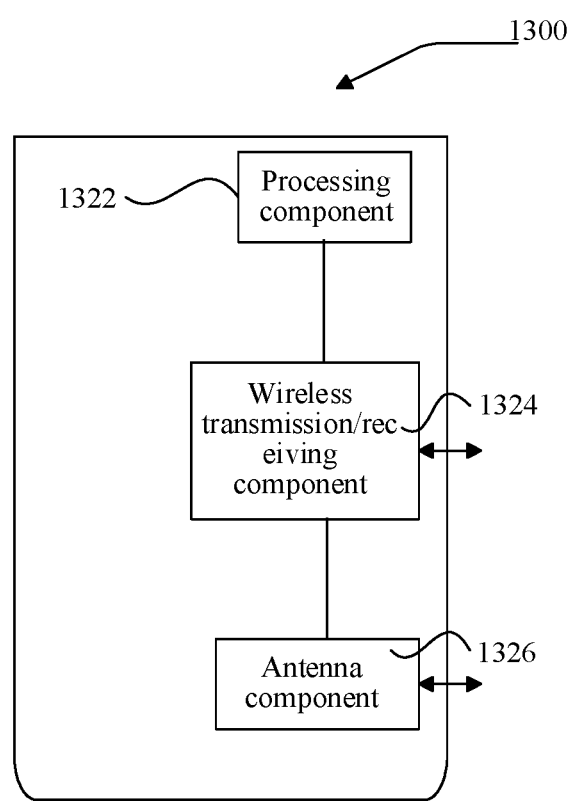
FIG. 13 is a block diagram applied to a device for determining an optimal beam according to an exemplary embodiment.

FIG. 13 is a block diagram applied to a device for determining an optimal beam according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to:

receive a third message (MSG3) sent by UE on an optimal beam; and return a fourth message (MSG4) to the UE on the optimal beam or return a fourth message (MSG4) to the UE on an initial beam originally configured to send the MSG3.

In an exemplary embodiment, there is also provided a non-transitory computer-readable storage medium including instructions, and the instruction may be executed by the processing component 1322 of the device 1300 to implement the method for determining an optimal beam. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an" does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for reporting an optimal beam, implemented by User Equipment (UE) and comprising:
sending a third message (MSG3) on a measured optimal beam to a base station; and
waiting, on both the measured optimal beam and an initial beam originally configured to send the MSG3, to receive a fourth message (MSG4) returned by the base station;
in a case that the MSG4 is received on the measured optimal beam, transmitting signaling or data on the optimal beam;
in a case that the MSG4 is received on the initial beam, receiving an optimal beam measurement request from the base station, sending an optimal beam measurement report to the base station based on the optimal beam measurement request to enable the base station to return an identifier (ID) of an adjusted optimal beam based on the optimal beam measurement report, and in a case that the UE is kept in a connected state, receiving signaling or data sent by the base station on the adjusted optimal beam.

2. A non-transitory computer-readable storage medium, having a computer program stored thereon which, when executed by a processor, enables to implement the steps of the method for reporting an optimal beam of claim 1.

3. A communication system implementing the method of claim 1, wherein the MSG3 is sent to a base station on the measured optimal beam, such that the measured optimal beam is reported implicitly in a random-access process, without additionally defining bits for representing beam information, thereby saving resources.

4. The communication system of claim 3, wherein the MSG3 sent by the UE on the optimal beam is received, the base station is configured to learn about the optimal beam measured by the UE.

5. The communication system of claim 4, wherein no bit for representing beam information is additionally defined, thereby saving resources.

6. The communication system of claim 5, comprising the UE and the base station.

7. A method for determining an optimal beam, implemented by a base station and comprising:
receiving a third message (MSG3) sent by User Equipment (UE) on an optimal beam; and
returning a fourth message (MSG4) to the UE on the optimal beam, and returning a fourth message (MSG4) to the UE on an initial beam originally configured to send the MSG3;
in the case of returning the MSG4 to the UE on the initial beam originally configured to send the MSG3, sending an optimal beam measurement request to the UE, receiving an optimal beam measurement report sent by the UE based on the optimal beam measurement request, performing beam adjustment according to an optimal beam Identifier (ID) contained in the optimal beam measurement report, sending an ID of an adjusted optimal beam to the UE, and transmitting signaling or data on the adjusted optimal beam;
in the case of returning the MSG4 to the UE on the optimal beam that is measured by the UE, transmitting signaling or the data on the optimal beam.

8. A device for determining an optimal beam, comprising a processing component and a wireless transmission/receiving component, wherein the wireless transmission/receiving component is configured to implement the method of claim 7.

9. A non-transitory computer-readable storage medium, having a computer program stored thereon which, when executed by a processor, enables to implement the steps of the method for determining an optimal beam of claim 7.

10. A device for reporting an optimal beam, implemented by User Equipment (UE), comprising a processing component and a communication component, wherein:
the communication component is configured to send a third message (MSG3) on a measured optimal beam to a base station;
the processing component is configured to, after the communication component sends the MSG3 to the base station on the measured optimal beam, control the communication component to wait, on both the optimal beam and an initial beam originally configured to send the MSG3, to receive a fourth message (MSG4) returned by the base station;
the communication component is further configured to:
in a case that the MSG4 is received on the optimal beam, transmit signaling or data on the optimal beam; and in a case that the MSG4 is received on the initial beam, receive an optimal beam measurement request from the base station, send an optimal beam measurement report to the base station based on the optimal beam measurement request to enable the base station to return an identifier (ID) of an adjusted optimal beam based on the optimal beam measurement report, and in a case that the UE is kept in a connected state, receive signaling or data sent by the base station on the adjusted optimal beam.

* * * * *